United States Patent [19]
Schulte et al.

[11] Patent Number: 5,659,177
[45] Date of Patent: Aug. 19, 1997

[54] DIRECTIONAL THERMAL NEUTRON DETECTOR

[75] Inventors: Robert L. Schulte, Port Washington; Frank R. Swanson, Freeport, both of N.Y.

[73] Assignee: Northrop Grumman Corporation, Los Angeles, Calif.

[21] Appl. No.: 400,909

[22] Filed: Mar. 8, 1995

[51] Int. Cl.$^6$ ........................................................ G01T 3/08
[52] U.S. Cl. .............................. 250/390.12; 250/370.05; 250/370.1
[58] Field of Search .................. 250/390.12, 370.05, 250/370.1

[56] References Cited

U.S. PATENT DOCUMENTS

| | | | |
|---|---|---|---|
| 3,581,091 | 5/1971 | Meijer | 250/370.05 |
| 5,036,202 | 7/1991 | Schulte | 250/390.12 |

*Primary Examiner*—Carolyn E. Fields
*Attorney, Agent, or Firm*—Terry J. Anderson; Karl J. Hoch, Jr.

[57] ABSTRACT

A directional thermal neutron detector for detecting thermal neutrons and determining the direction of the thermal neutron source. The directional detector includes an array of individual thermal neutron detector modules, each of which comprises front and back planar silicon detectors having a gadolinium foil sandwiched therebetween. The array comprises a plurality of individual detector modules which are angularly displaced with respect to each other. The direction of the thermal neutron source is determined by comparing the magnitudes of the output signals from the plurality of angularly displaced detector modules. Each thermal neutron detector module is segmented into four quadrants to reduce its capacitance and resultant noise. The thickness of the gadolinium foil in each thermal neutron detector module is at least 15 microns thick, to improve the front-to-back silicon detector counting ratio to ascertain the side (front or back) from which thermal neutrons are arriving at the detector. Moreover, the thick gadolinium foil makes each detector module substantially opaque to thermal neutrons, and the detector modules are positioned relative to each other in the array to shield one another from thermal neutrons, thereby enhancing the angular resolution of the directional thermal neutron detector. Gamma rays are discriminated against by using coincidence signal processing within the elements of the detector sandwich to reduce the gamma ray contribution to the total signal.

21 Claims, 6 Drawing Sheets

DIRECTIONAL THERMAL NEUTRON DETECTOR

BACKGROUND OF THE INVENTION

1. Field of the Invention

The present invention relates generally to directional thermal neutron detectors, and more particularly pertains to a directional thermal neutron detector which utilizes the inherent angular response of large area, planar silicon detectors and gadolinium foils to determine the direction of a thermal neutron radiation source. The directional thermal neutron detector can also advantageously utilize the shadowing provided by adjacent thermal neutron detector modules, which are positioned to function as shields, to enhance the directional response thereof.

2. Discussion of the Prior Art

Nuclear weapon non-proliferation and counter-proliferation have become national priorities, and various nuclear non-proliferation sensors, thermal neutron detectors, and radiation level monitors are required to conduct surveillance and inspection of sites, nuclear power plants, space experiments, etc. in nuclear non-proliferation and treaty-verification programs.

Thermal neutron detection offers an effective method for determining the presence of spontaneously fissionable materials which are used in nuclear weapons. Fission neutrons emitted from such weapons-related materials undergo collisions with their surroundings and readily become "thermalized". Since the natural background of thermal neutrons is very low at the earth's surface (~1 neutron/s per 1000 $cm^2$), detection of thermal neutrons at a rate significantly above this level is a cause for suspicion of the presence of fissionable nuclear materials. Accordingly, thermal neutrons can be detected to determine the presence and location of fissionable nuclear materials and nuclear weapons.

Conventional portable neutron survey meters are not suitable for low level thermal neutron detection applications because their counting sensitivity is very poor. Only large, unmoderated $^3$He proportional tubes can obtain a comparable thermal neutron sensitivity for a limited available area. $^3$He tubes, however, cannot easily furnish a source directionality measurement that is unique to the present detector system.

The thermal neutron detector of the present invention offers unique advantages relative to prior art detection systems based upon $BF_3$ or $^3$He proportional counters that are commonly used for neutron detection. It provides comparable neutron sensitivity, and does not require high voltage for operation. The present detector system avoids problems inherent in field deployment of high voltage equipment, such as break down and sparking in a humid environment. The present detector system also has a more compact and rugged design for improved reliability under vibration and mechanical shock. The thermal neutron detector of the subject invention is highly modular and, therefore, less susceptible to single point failures, while systems of proportional counters of comparable area (e.g., 5 or 6 one inch tubes) would suffer greater loss of efficiency if one or more proportional tubes failed. Furthermore, the thermal neutron detector of the present invention provides a directional detecting capability, a feature which is not easily implemented in a portable system using proportional tubes. Existing thermal neutron detectors require special collimation to achieve a directional sensing capability, which results in the addition of weight to the system.

Radiation monitors for thermal neutrons based upon thin gadolinium foils coupled with silicon detectors have been in use in the prior art for several years. Recently the availability of large area silicon photodiodes makes large area monitors feasible, with a potential for arrays of such detectors with active areas well in excess of 100 $cm^2$. In practice, however, there are limitations to the area of a single detector element and its associated pulse processing electronics. The noise levels in the photodiode and preamplifier system must be sufficiently low such that the low energy (29–200 keV) conversion electrons emitted by thermal neutron capture in gadolinium are detected with sufficient efficiency to obtain a high area-efficiency (A$\epsilon$) product for the monitor. For large area silicon detectors, the capacitance of the parallel elements in the detector can reach several hundred picofarads which becomes the dominant factor in the noise of the system, and determines the required low level discriminator threshold setting. As the discriminator threshold is increased, the intrinsic detection efficiency is reduced, and the result is a tradeoff between increased detection area and reduced efficiency.

SUMMARY OF THE INVENTION

Accordingly, it is a primary object of the present invention to provide a directional thermal neutron detector which is capable of detecting thermal neutrons produced as a result of the presence of fissionable nuclear materials. The detector has directional sensitivity, and an array of basic detector modules or units can be readily configured to produce a detector system which determines the direction of the source of thermal neutron radiation. The detector unit permits the location of suspect nuclear weapons or nuclear weapons fissionable materials, and has the capability of being compact, lightweight and portable, fitting into a briefcase-size housing. Accordingly, it has the capability of fitting within a variety of surveillance platforms to determine the presence and direction of nuclear weapon fissionable materials.

A further object of the subject invention is the provision of a solid state approach for directionally detecting thermal neutrons with high efficiency. A modular detector array can be sized to specific detection application requirements in a compact, portable and low power unit. The configuration is flexible and microprocessor controllable, with a straightforward implementation of data analysis and directional determination.

In accordance with the teachings herein, the present invention provides a directional thermal neutron detector for detecting thermal neutrons and determining the direction of the source of the thermal neutrons. The directional detector includes an array of individual thermal neutron detector modules, each of which comprises front and back planar silicon detectors having a gadolinium foil sandwiched therebetween. The array comprises a plurality of individual detector modules which are angularly displaced with respect to each other. The direction of the thermal neutron source is determined by comparing the magnitudes of the output signals from the plurality of angularly displaced detector modules.

In greater detail, each thermal neutron detector module is segmented into a plurality of segmental areas, preferably four quadrants, to reduce the capacitance and the resultant noise of each detector module. Each segmental area produces a separate output thermal neutron count signal which is separately counted and stored. Each detector module produces an output thermal neutron count signal, which is compared with the output count signals of other detector modules by forming ratios of the output count signals of the different detector modules to determine the direction of the thermal neutron source.

In accordance with one preferred aspect of the present invention, the thickness of the gadolinium foil in each thermal neutron detector module is at least 15 microns thick, to improve the front-to-back silicon detector counting ratio to ascertain the side (front or back) from which thermal neutrons are arriving at the detector. Moreover, a relatively thick, relative to the prior art, gadolinium foil makes each detector module substantially opaque to thermal neutrons. The present invention takes advantage of this feature, and the detector modules are positioned relative to each other in the array to shield one another from thermal neutrons, thereby enhancing the angular resolution of the directional thermal neutron detector.

The silicon/gadolinium/silicon detector also responds to gamma rays, which are essentially noise, and the present invention compensates for the response to gamma rays in two fashions.

In a first approach, the arrangement adds a separate gamma ray detector compensator module which comprises front and back planar silicon detectors having a tantalum foil sandwiched therebetween. The thickness of the tantalum foil is chosen to have a low thermal neutron cross-section sized to compensate for gamma ray responses by the thermal neutron detector modules. The count signal measured by the gamma ray compensator is then subtracted from the count signals from the thermal neutron detector modules to determine the net thermal neutron count.

The second approach recognizes that gamma rays interact with the gadolinium foil to produce very high energy electrons which readily penetrate through the gadolinium foil and the front and back silicon detectors to produce substantially simultaneous detector outputs from the front and back detectors. This is in contrast to the low energy electrons produced by thermal neutrons which are completely attenuated by the gadolinium foil after traveling therethrough for only several microns. A thermal neutron produces a response from only one of the front or back detectors, whereas a gamma ray produces substantially simultaneous outputs from the front and back detectors. Accordingly, the present invention can improve the discrimination against gamma rays by using coincidence signal processing within the elements of the detector sandwich to reduce the gamma ray contribution to the total signal in the detector and thereby enhance the thermal neutron detection selectivity. The coincidence signal processing essentially disregards signals which are simultaneously generated by both the front and back silicon detectors.

The array of thermal neutron detector modules includes at least one detector module oriented in a first direction, and at least one detector module oriented in a second direction inclined at an angle relative to the first direction. In one disclosed embodiment, the positive angle is substantially 90°. In a further embodiment, the array also includes at least one detector module oriented in a third direction inclined at a negative angle relative to the first direction and angle. In that embodiment, the first angle is substantially +45°, and the negative angle is substantially –45°. Depending upon the configuration of the array, a straightforward algorithm is utilized, based upon the count ratios between the different detector modules, to determine in real-time the direction of the thermal neutron source.

In preferred embodiments, the array of thermal neutron detector modules includes a plurality of detector modules oriented in each of the first, second, and optionally third directions, to increase the area efficiency product (Aϵ) of the directional thermal neutron detector. The output signals from the modules oriented in the same direction are summed in a separate counter, thus providing a separate summed output for each direction, and the direction of the thermal neutron source is determined by comparing the counts in each of the separate counters.

In one preferred embodiment, the array of thermal neutron detector modules includes at least six detector modules arranged in an H-configured array which provides substantially 360 degree sensitivity and detection coverage, while also providing shielding of adjacent detector modules to improve the angular resolution of the detector array.

The present invention also provides several features which are considered to be novel, aside from being incorporated into a directional thermal neutron detector array as described herein.

The first feature is the provision of a thermal neutron detector comprising front and back planar silicon detectors having a gadolinium foil sandwiched between the active areas of the front and back silicon detectors, wherein the thickness of the gadolinium foil is at least 15 microns, to improve the front-to-back silicon detector counting ratio to determine the side from which thermal neutrons are arriving at the detector. Moreover, the relatively thick gadolinium foil makes the detector substantially opaque to thermal neutrons, and the detector can be positioned relative to other detectors to shield one another from thermal neutrons.

The second feature is the provision of a thermal neutron detector comprising front and back planar silicon detectors having a gadolinium foil sandwiched between the active areas of the front and back silicon detectors, wherein gamma rays are discriminated against by performing coincidence signal processing between the output signals of the front and back silicon detectors of each detector module, wherein simultaneous signal counts of the front and back detectors are disregarded, to minimize the contribution of gamma rays to the signal produced by the detector module, thereby enhancing the detectional selectivity to thermal neutrons.

BRIEF DESCRIPTION OF THE DRAWINGS

The foregoing objects and advantages of the present invention for a directional thermal neutron detector may be more readily understood by one skilled in the art, with reference being had to the following detailed description of several preferred embodiments thereof, taken in conjunction with the accompanying drawings wherein like elements are designated by identical reference numerals throughout the several views, and in which.

DETAILED DESCRIPTION OF THE DRAWINGS

Figure 1:
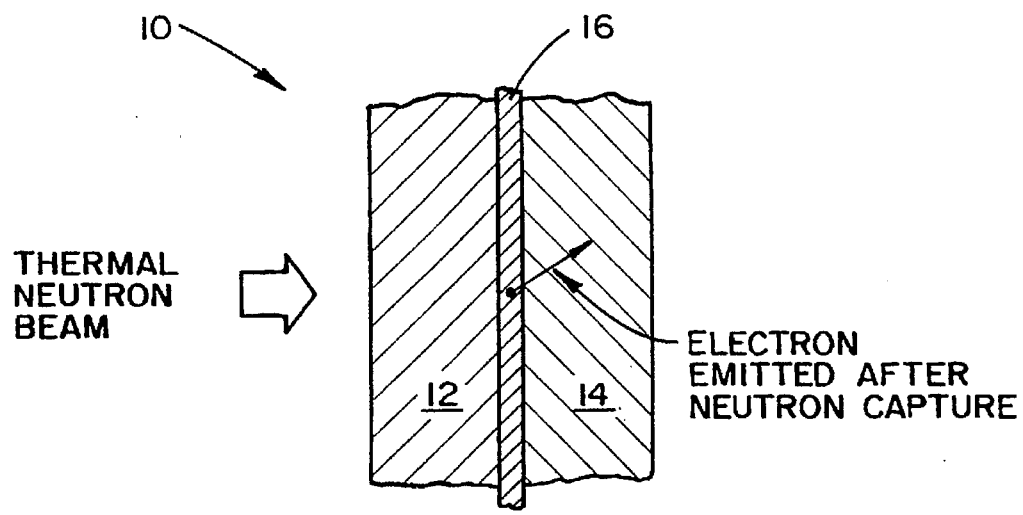
FIG. 1 is a conceptual drawing illustrating the concept and configuration of a known prior art thermal neutron detector which consists of two detector layers, such as thin silicon detectors, having a gadolinium (Gd) foil sandwiched therebetween.

Referring to the drawings in detail, FIG. 1 is a conceptual drawing illustrating the concept and configuration of a known prior art thermal neutron detector 10 which consists of first (front) and second (back) detector layers 12, 14, such as thin silicon wafer detectors, having a thin gadolinium (Gd) foil 16 sandwiched therebetween. The thin gadolinium foil 16 absorbs thermal neutrons, and emits low energy electrons in response thereto which are detected by the adjoining silicon detector layers, which produce voltage pulses in response thereto. The present invention recognized that the thermal neutron absorption by the gadolinium foil follows an exponential function with respect to the foil thickness, and the limited range of the low energy conversion electrons results in a differential count rate between the front and back detector layers 12 and 14.

In FIG. 1, a thermal neutron entering the detector arrangement from the left side passes through the front left silicon wafer 12 with substantially no attenuation, and then passes into the gadolinium foil 16 where it is absorbed and causes the emission of a single electron, which is emitted in a randomly isotropic direction. Some electrons will be emitted from the left side of the gadolinium foil, and some electrons will be emitted from the right side of the gadolinium foil. However, since the gadolinium foil absorbs the thermal neutrons as they pass therethrough, more electrons will be emitted from the left side. Moreover, the electrons which are emitted in random directions are absorbed by the gadolinium foil after they travel therethrough for several microns unless they exit the foil. Accordingly, with most of the electrons being emitted from the left side of the gadolinium foil, those traveling to the left stand more of chance of exiting the gadolinium foil, while those traveling to the right stand more of a chance of being absorbed by the foil. The net result of these two effects is that more of the electrons traveling to the left will exit from the gadolinium foil than electrons traveling to the right. This results in a higher count output from the left silicon detector 12 than the right silicon detector 14.

The opposite is true for thermal neutrons entering the detector arrangement from the right side, in which case the right silicon detector 14 will produce a higher count output. Accordingly, the ratio of the left and right detector count outputs indicates the side on which the thermal neutron source is located.

Figure 2:
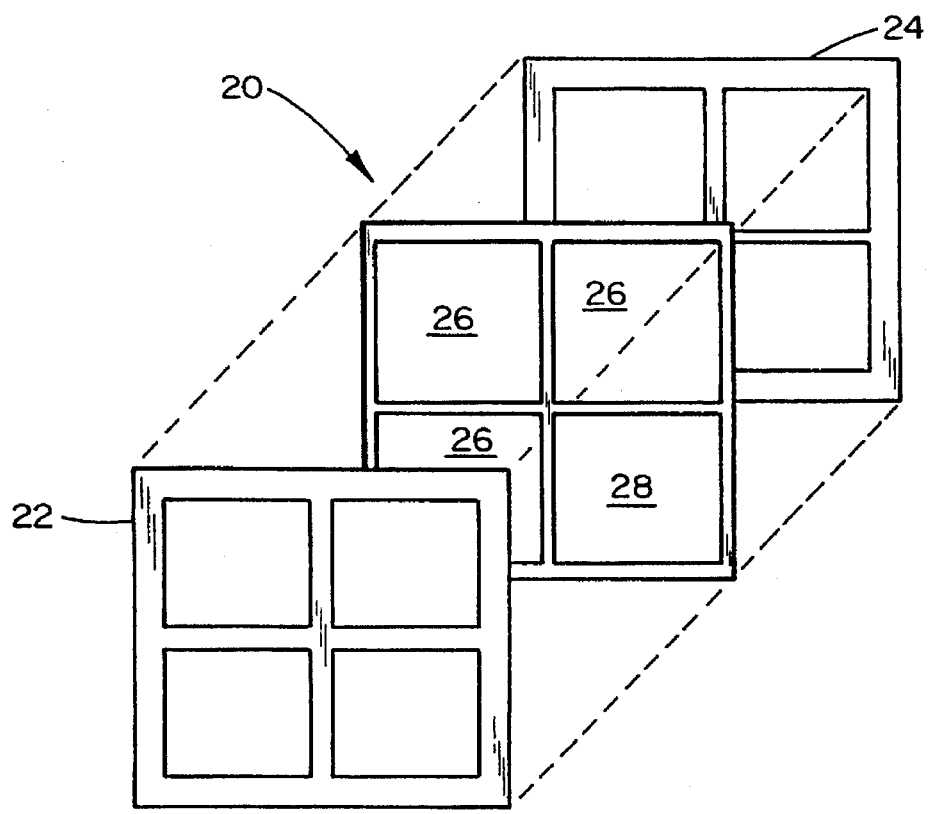
FIG. 2 illustrates an expanded view of a basic module of a directional thermal neutron detector which consists of first and second quadrature segmented silicon detectors having a gadolinium (Gd) foil sandwiched between the active areas of the detectors in three of the quadrants and a tantalum (Ta) foil sandwiched therebetween in the fourth quadrant.

FIG. 2 illustrates an expanded view of a basic module of a directional thermal neutron detector 20 which consists of first and second quadrature segmented silicon detectors 22, 24 having a gadolinium (Gd) foil 26 sandwiched between the active areas of the detectors in three of the quadrants and a tantalum (Ta) foil 28 sandwiched therebetween in the fourth quadrant. The planar silicon detectors are segmented into four quadrants to reduce the individual capacitance of each detector quadrant, with three of the quadrants serving as thermal neutron detectors and the fourth quadrant providing real-time gamma ray compensation.

The selectivity of the detector arrangement to thermal neutron detection is enhanced by using a gamma ray compensation technique for removing the response of the detector arrangement to incident gamma rays. A matched response of the tantalum foil 28 in the fourth quadrant is used to mimic the gamma ray interaction response of the gadolinium detectors by selecting the thickness of the tantalum foil 28 to have the same interaction cross section (or probability) as the gadolinium foils 26. The count rate of the gamma detector in the fourth quadrant is then subtracted from the thermal neutron detector count rates in the first three quadrants to provide the net thermal neutron count rate. Gamma ray compensation for a gadolinium foil having a >15 µm thickness is achieved by using a tantalum foil which is approximately 2.5 times thinner than the gadolinium foil., and has negligible thermal neutron capture cross-section, but has a gamma ray scattering probability comparable to the gadolinium foils over a wide range of gamma ray energies (0.2–2.5 MeV). The signals from each of the detector quadrants are counted and stored separately, and the count rates from the thermal neutron detection quadrants are adjusted in real-time by subtracting the count rate measured by the gamma ray compensation quadrant.

The present invention uses two techniques to compensate for gamma rays. The first technique is the use of a compensating tantalum foil gamma ray detector as discussed hereinabove. The second technique recognizes that gamma rays interact with the gadolinium foil to produce very high energy electrons which readily penetrate through the gadolinium foil and the front and back silicon detectors to produce substantially simultaneous detector outputs from the front and back detectors. This is in contrast to the low energy electrons produced by thermal neutrons which are completely attenuated by the gadolinium foil after traveling therethrough for only several microns. A thermal neutron produces a response from only one of the front or back detectors, whereas a gamma ray produces substantially simultaneous outputs from the front and back detectors. Accordingly, the present invention can improve the discrimination against gamma rays by using coincidence signal processing within the elements of the detector sandwich to reduce the gamma ray contribution to the total signal in the detector and thereby enhance the thermal neutron detection selectivity. The coincidence signal processing essentially disregards signals which are simultaneously generated by both the front and back silicon detectors.

A unique advantage of the thermal neutron detector of the present invention is its very low intrinsic gamma ray sensitivity because only very thin (<150 microns) active regions are needed for the silicon wafers to detect the emitted electrons. The low intrinsic gamma ray sensitivity results in a significantly enhanced signal-to-noise ratio for thermal neutron detection compared to more conventional detectors such as $^3$He proportional counters.

In a preferred embodiment, the detector module 20 consists of two planar silicon detectors, each 5.0 cm×5.0 cm, segmented into four quadrants of 2.5 cm×2.5 cm. The detectors reach their full depletion depth of 300 μm with less than 20V applied bias voltage. This results in a detector arrangement wherein capacitance is the dominant factor contributing to the noise in the detector system since the reverse detector currents are small, <20 na per quadrant.

The gadolinium foils 26 are mounted in close proximity to the front and rear silicon detectors 22, 24, but not in contact therewith, so that the detectors are not coupled electrically, which would otherwise increase the total detector capacitance and the corresponding noise threshold in the electronics. The noise threshold is a critical factor impacting on the efficiency of the detector since the efficiency decreases monotonically with increasing threshold level.

Figure 3:
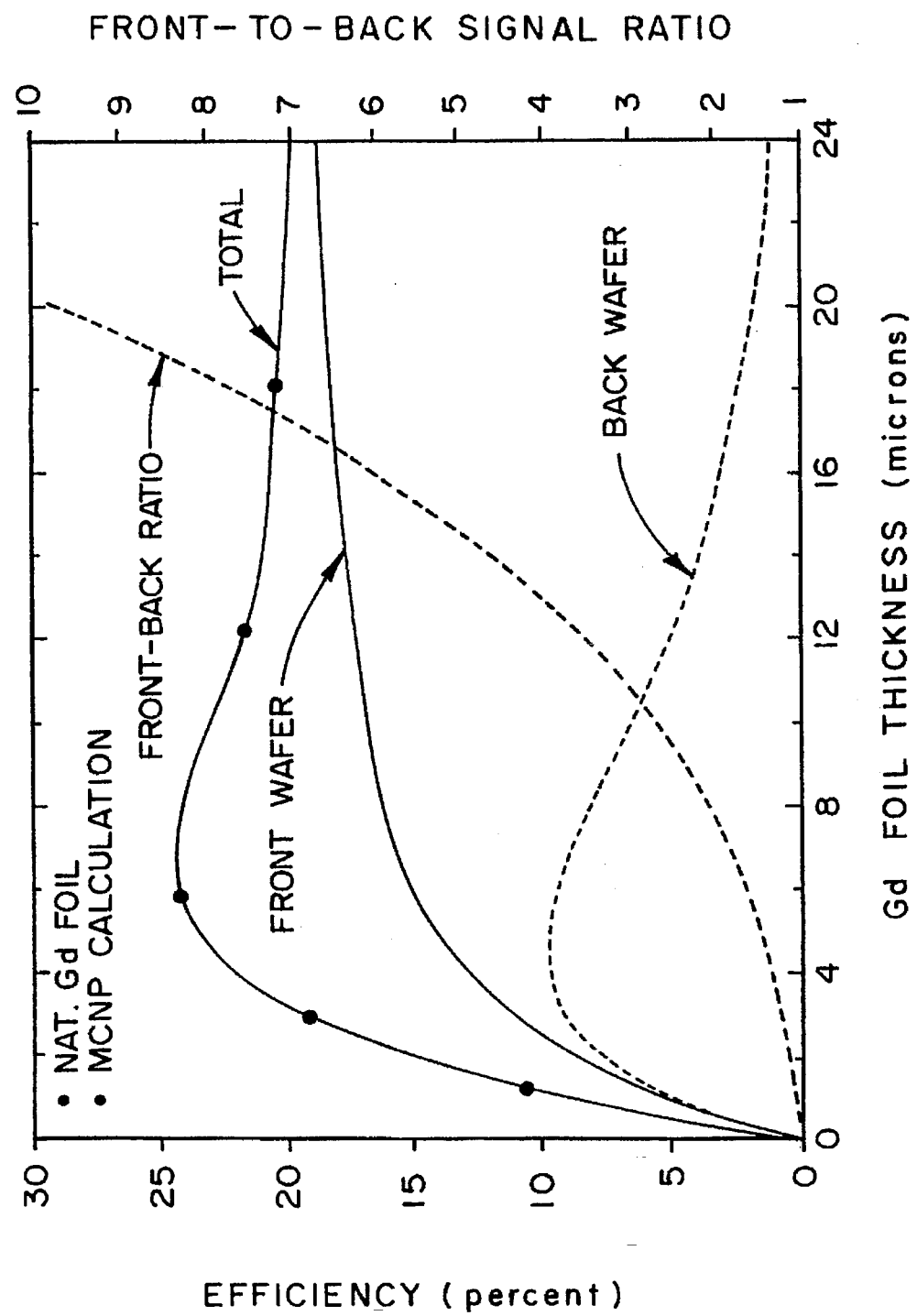
FIG. 3 is a graph of detection efficiency (as a percentage) plotted as a function of the thickness of the gadolinium foil in microns, and also of the front to back signal ratio plotted as a function of the gadolinium foil thickness.

FIG. 3 is a graph of detection efficiency (as a percentage) plotted as a function of the thickness of the gadolinium foil in microns, and also of the front to back signal ratio plotted as a function of the gadolinium foil thickness. FIG. 3 illustrates that the detection efficiency for the front and back silicon detectors for thermal neutrons depends upon the thickness of the gadolinium foil. Proper selection of the gadolinium foil thickness permits distinguishing the count rates in the front and back silicon detectors, which enables a determination of the side from which the thermal neutrons are incident. The ratio of the count rates establish the front-to-back directionality. A large front-to-back counting ratio, associated with a thicker gadolinium foil, improves the front/back directional response.

Although the prior art has used silicon/gadolinium/silicon detectors as illustrated in FIG. 1, the prior art has not used such detectors with a relatively thick (>15 microns) gadolinium layer as taught by the present invention. The reason for this is illustrated in FIG. 3, which illustrates curves of the efficiencies (per cent) of the beam side detector, the back side detector, and the combined total efficiency of both the beam side and the back side detectors as a function of the thickness of the gadolinium foil. The combined total efficiency is seen to peak at approximately 6 to 8 microns, which was accordingly chosen in the prior art to maximize the detector efficiency. In the prior art, a selected optimal thickness of gadolinium foil represented a compromise between conflicting requirements of maximizing neutron capture probability and also allowing the conversion electrons to escape from the foil. Prior art studies indicated that this optimal thickness for gadolinium was in the range of 6 to 8 microns.

In contrast thereto, the present invention provides a directional detector which, inter alia, detects the front/back direction of a thermal neutron. To maximize the front/back directionality of the thermal neutron detector, the present invention provides a strong front-to-back ratio which is provided by a thicker gadolinium foil. Accordingly, the present invention uses relatively thick (>15 microns) gadolinium foils in a detector sandwich configuration to increase the differentiation of the front-to-back incidence of thermal neutrons. This approach results in a slightly lower detection efficiency, but improves the front-to-back counting ratio in order to distinguish the side from which the neutrons are arriving at the detector.

Using thick gadolinium foils makes each sandwich detector practically opaque to thermal neutrons. The present invention takes advantage of this feature by configuring the detectors so that the detectors can shield one another, with the result that the directional response is enhanced by tracking the count rate in the detectors to determine the direction of the thermal neutron source.

Figure 4:
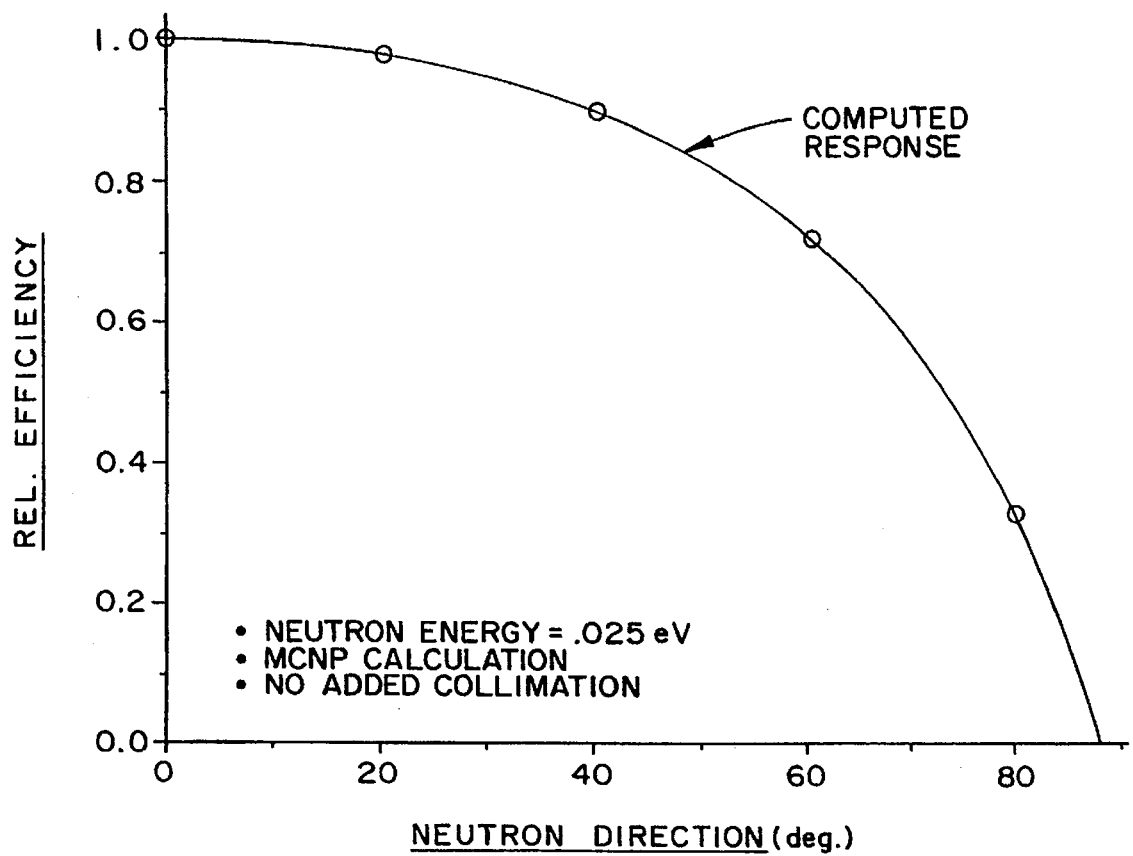
FIG. 4 is a graph of the angular response of a silicon/gadolinium/silicon directional thermal neutron detector, plotted as relative efficiency of detection versus the angle of incidence of the thermal neutrons, and illustrates that the planar configuration of the silicon/gadolinium/silicon module produces a response which is dependent upon the angle of incidence of the detected thermal neutrons.

FIG. 4 is a graph of the angular response of a silicon/gadolinium/silicon directional thermal neutron detector, similar to the detector of FIG. 1, plotted as relative efficiency of detection versus the angle of incidence of the thermal neutrons. FIG. 4 illustrates that the planar configuration of the silicon/gadolinium/silicon module produces a response to thermal neutrons which is dependent upon their angle of incidence. The angular directional response as shown in FIG. 4 is a result of the planar configuration of the basic detector unit.

Figure 5:
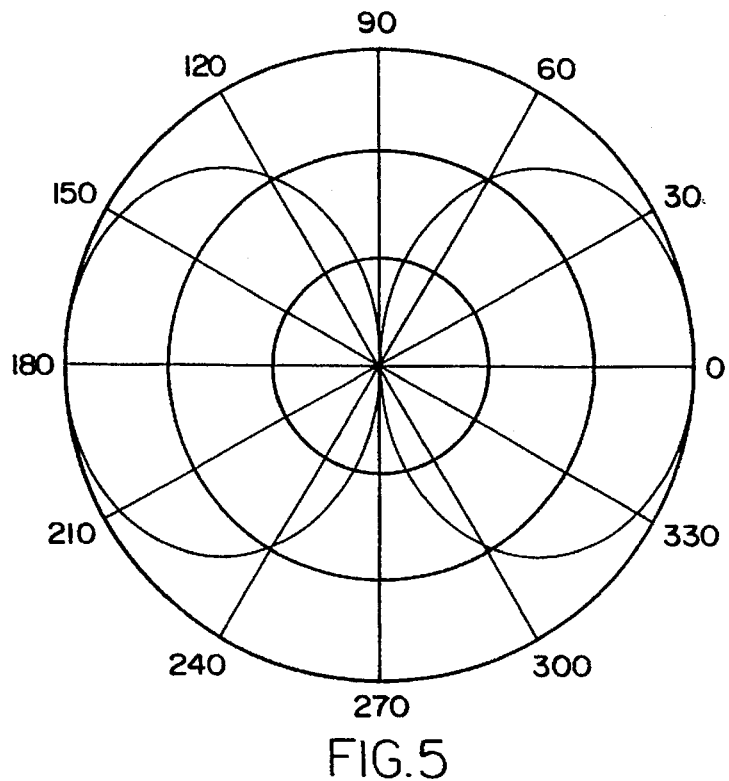
FIG. 5 is a polar plot of the directional sensitivity or basic angular response of a planar directional thermal neutron detector module aligned along the 90°–270° direction of the graph, and illustrates conceptually that a detection system having an array of multiple detection modules aligned along different directions can detect the angular position of a thermal neutron radiation source by comparing the count rates measured in the different detector modules.

FIG. 5 is a polar plot of the directional sensitivity or basic angular response of a planar directional thermal neutron detector module aligned along the 90°–270° direction of the graph. FIG. 5 illustrates conceptually that a detector system having arrays of multiple detection modules aligned along or pointing in different directions can detect the angular position of a thermal neutron radiation source by comparing the count rates measured in the different detector modules. An algorithm can be developed in a straightforward manner for each particular configuration of detector modules to uniquely detect the direction of the thermal neutron radiation source. Specially configured arrays of the basic detector unit can be designed to limit the sensitivity to a specific direction or overall spatial directions.

Figure 6:
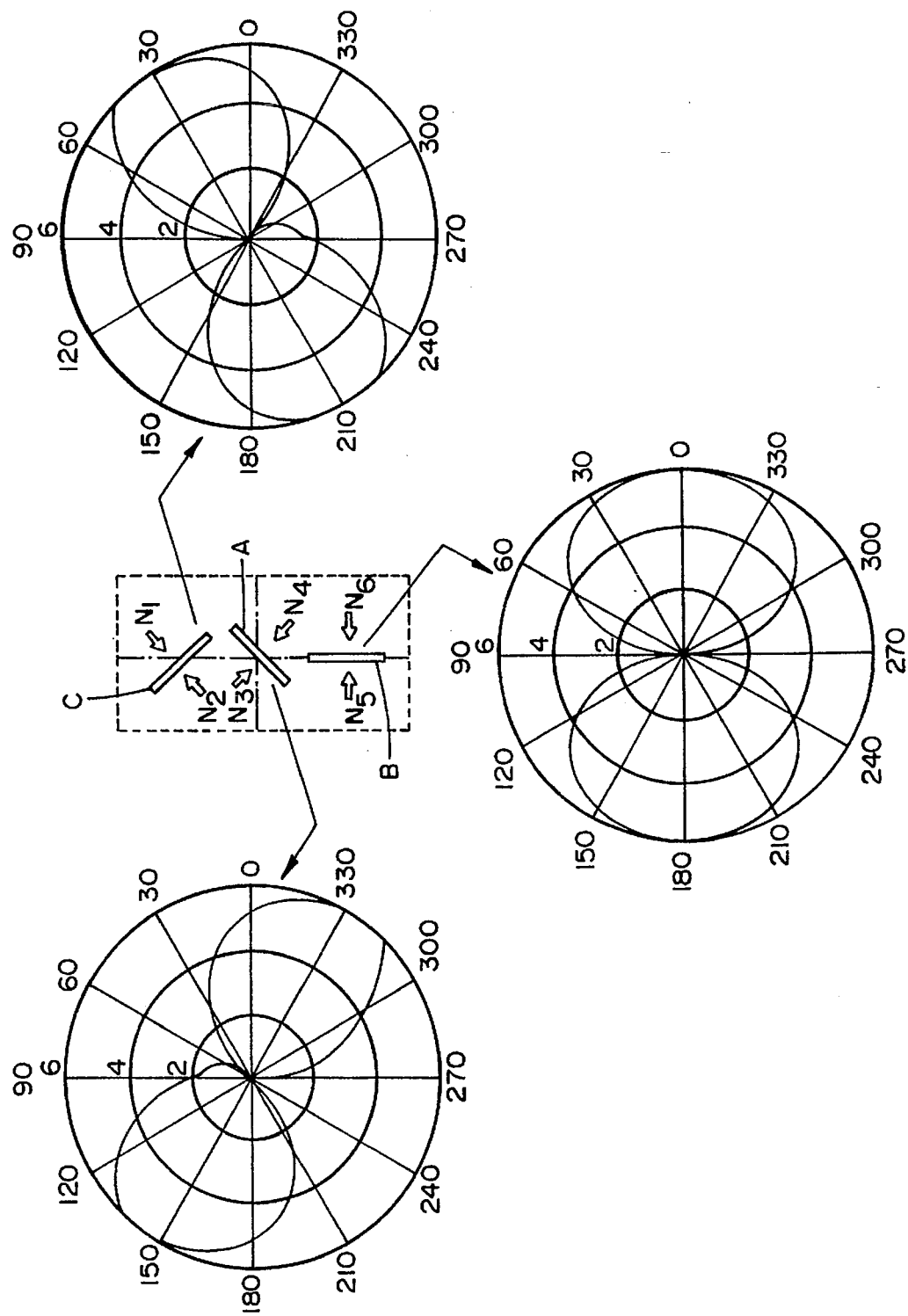
FIG. 6 illustrates three different orientations of three detector modules positioned in a first embodiment of a detector array, and graphs of the relative angular responses of the three orientations of the detector modules.

FIG. 6 illustrates a first embodiment of an array of detector modules having three different orientations of three detector modules A, B and C, and graphs of the relative angular responses of the three orientations of the detector modules within the detector array. The three directional modules illustrated in FIG. 6 comprise a basic directional array of modules, with a first module C facing upper right to lower left at –45°, a second module A facing upper left to lower right at +45°, and a third module B facing left and right. This basic array provides sufficient thermal count rates to determine the x,y direction of any radiation source positioned around the detector array. Moreover, a simple algorithm based upon the count ratios between the different detector elements determines in real-time the direction of the thermal neutron source.

Figure 7:
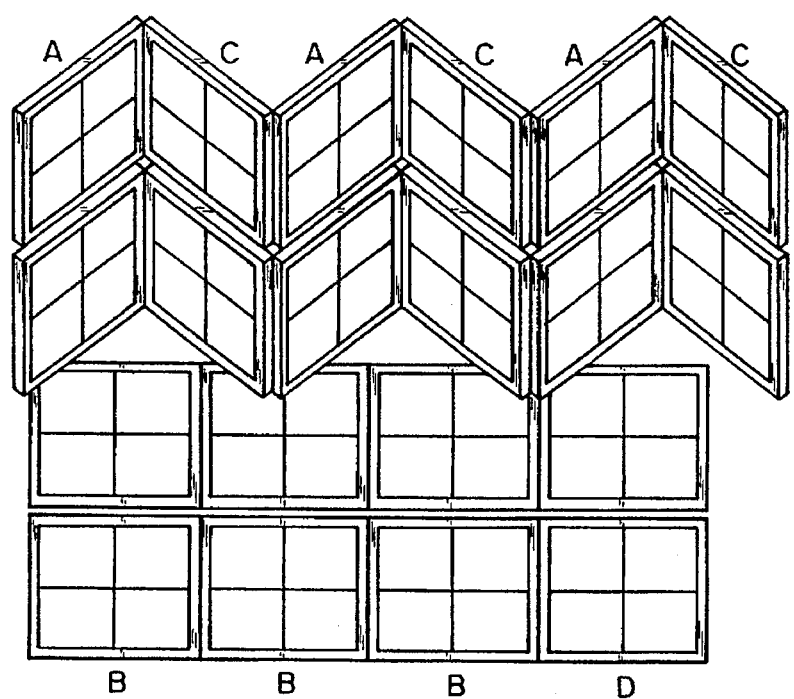
FIG. 7 illustrates a second embodiment of and array of detector modules for providing directional data.

FIG. 7 illustrates a second embodiment of a plurality of detector modules positioned in an array to provide directional capability. The second embodiment is similar to the first embodiment in having different detector modules A, B and C facing in three different directions. An effective thermal neutron detector should maximize the area efficiency product (Aε), with the larger the product, the greater the sensitivity of the detector. The embodiment of FIG. 7 reflects this design goal, and has a plurality of six detector modules A facing towards the left, a plurality of six detector modules C facing towards the right, and a plurality of six detector modules B facing in and out of the paper. The remaining two detector modules D facing in and out of the paper are provided for gamma ray compensation in a manner as explained with reference to FIG. 2.

Gamma rays are somewhat omnipresent radiation and do not have a directionality associated with them. Accordingly, there is no need to face the gamma ray detector panels or modules in all directions, and one set of gamma ray detector panels D facing in a single direction is adequate to provide gamma ray compensation.

The sensor system is constructed from twenty modules which can be configured as illustrated in FIG. 7 in a very compact configuration, suitable for example to fit inside a portable briefcase-size detector. Eighteen modules are constructed with a gadolinium converter, and two modules have tantalum and are used for background gamma ray compensation. A key feature of this design is the capability to measure not only the flux but also its direction over a wide field of view (360° azimuthally). This capability arises from the system's geometry and the nearly cosine angular response of the individual modules. Signals from modules oriented in the same direction are counted and summed, thus providing three readouts, one for each of the three orientations. Directionality is determined by comparing the net counts in each of the three counters. Note that directional information is obtained without the use of collimators that reduce overall efficiency and increase weight. This configuration of the detector modules provide directionality without the need for collimation.

Figure 8:
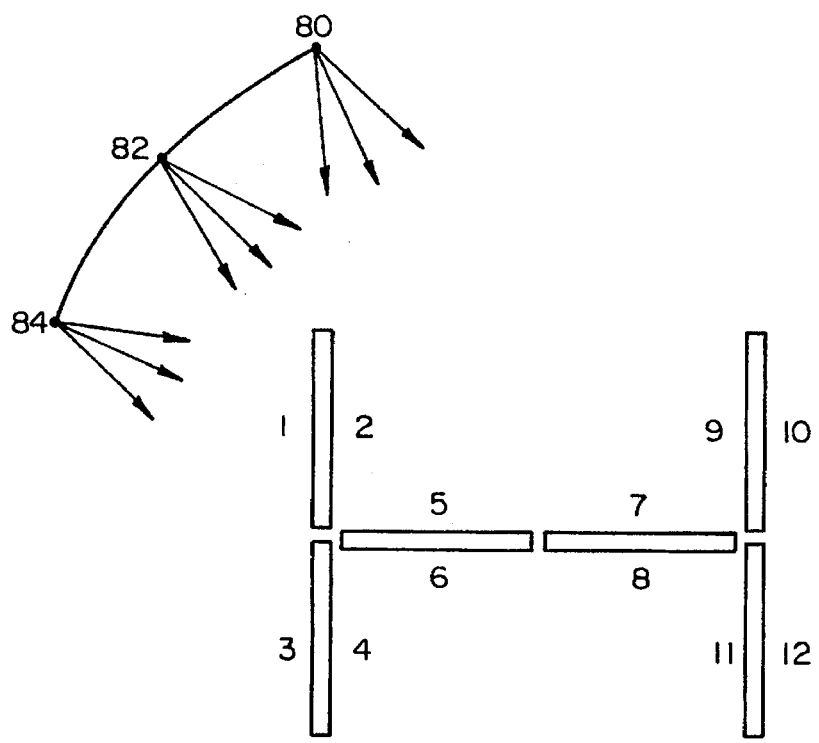
FIG. 8 illustrates a further embodiment of six detector modules arranged in a detector array similar to a goalpost which provides 360 degree sensitivity and detection coverage, and which also uses shadowing to improve the angular resolution of the detector array.

FIG. 8 illustrates a further embodiment of six detector modules arranged in an H-configured detector array (similar to a goalpost) which provides 360 degree sensitivity and detection coverage, and which also uses shielding to improve the angular resolution of the detector array. As explained hereinabove, the present invention uses relatively thick (>15 micron) gadolinium foils in a detector sandwich configuration to differentiate the front-to-back incidence of thermal neutrons. This approach results in a slightly lower detection efficiency than similar prior art detectors, but improves the front-to-back counting ratio in order to determine the side from which thermal neutrons are arriving at the detector. The thick gadolinium foils make each sandwich detector practically opaque to thermal neutrons. This characteristic is utilized to configure the detector modules to shield one another, with the result that the directional response is enhanced by tracking the count rates in the detectors to determine the direction of the source of thermal neutrons. A simple algorithm based upon count ratios is used for the different detector modules to determine in real-time the direction of the thermal neutron source.

FIG. 8 illustrates the shielding concept by thermal neutron sources located at positions 80, 82 and 84, particularly with reference to detector modules 1, 3, 5 and 7 which are most affected in the examples. At position 80, detector modules 5 and 7 will be fully illuminated by the thermal neutron source, whereas detector modules 1 and 3 will be obscured. At position 82, detector module 7 will still be fully illuminated by the thermal neutron source, although at a higher angle of incidence and therefore produce a lesser response (FIG. 4), whereas detector module 5 will be obscured, and detector modules 1 and 3 will be illuminated at relatively high angles of incidence. At position 84, detector modules 5 and 7 will be obscured, while detector modules 1 and 3 will be illuminated at lower angles of incidence and therefore produce a greater response (FIG. 4). The different angles of incidence produce different responses as shown in FIG. 4, and accordingly, ratios of the count outputs from detector modules 1, 2, 5 and 7 will be sharply different for the different positions 80, 82 and 84.

A preferred embodiment of a directional thermal neutron detector system provides a readout display to report the results in real-time. The analysis is preferably completely automated and performed with a programmed array logic. The information displayed is preferably the net thermal neutron count rate, and the average direction of the flux.

Figure 9:
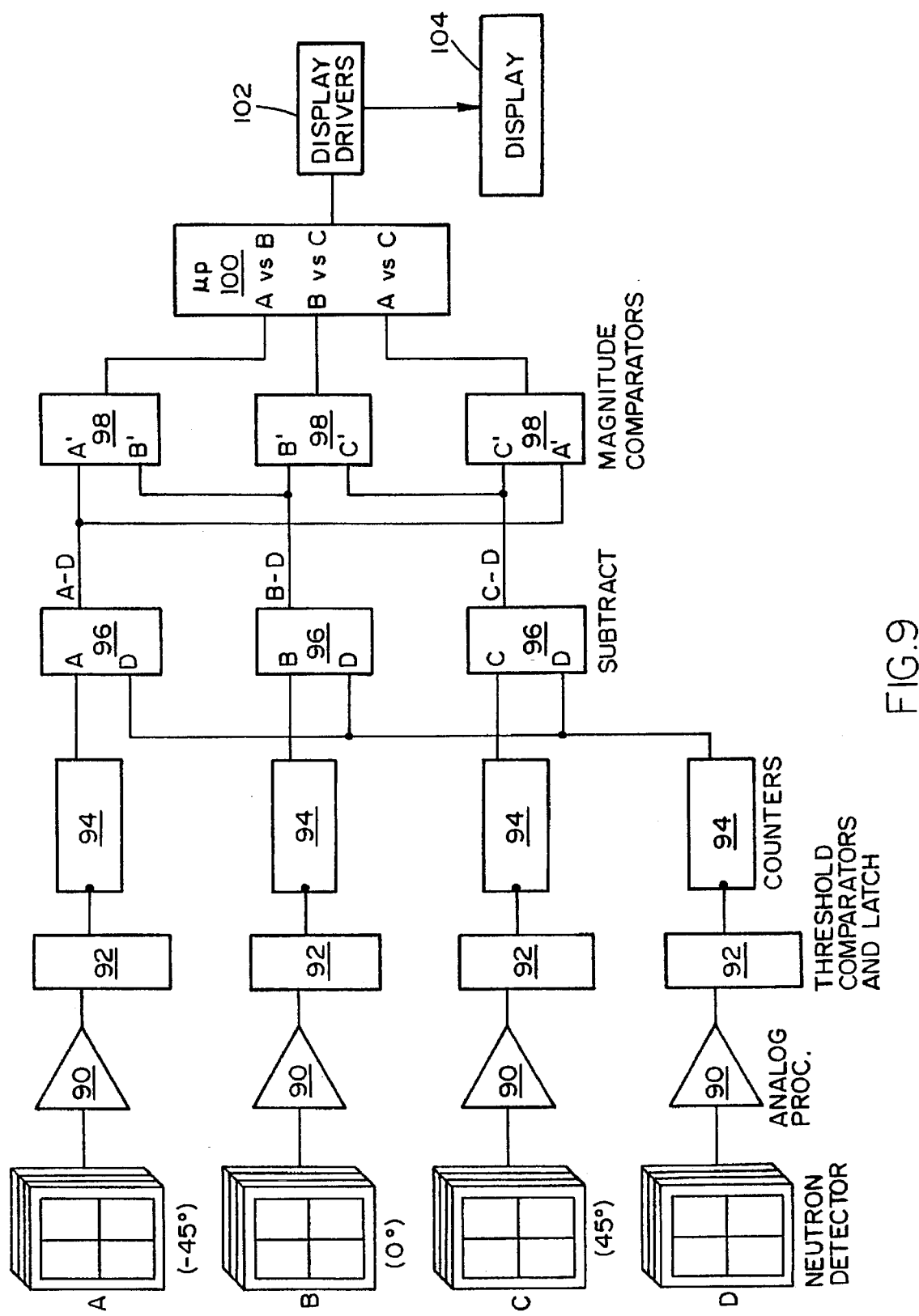
FIG. 9 illustrates a block diagram of an operational system from the silicon detector signals to the data display output wherein the system consists of 28 analog processing sections, a single digital processing section, and a power conditioning section.

FIG. 9 illustrates a block diagram of one embodiment of a complete operational system from the silicon detector signals to the data display output. The system consists of a plurality of analog processing sections, one for each detector module, a single digital processing section, and a power conditioning section. Printed circuit boards are preferably used to minimize noise levels and stray capacitances. The detectors are preferably arranged in modules, and the detector signals from each module are connected to a single analog processing circuit 90 and processed as shown at 92 with threshold comparators and latching. Sections A, B and C are used to count thermal neutrons and background, while D counts only the gamma ray background. After a designated period of time, the values in the counters 94 are latched and forwarded to the magnitude comparison logic. This section subtracts the background counts accumulated in D at 96, and performs the directional comparison of A versus B, B versus C, and A versus C at 98. The comparison results are input to a microprocessor 100 to determine the direction of the incoming neutrons, and a display driver 102 outputs the data to the operator via a display unit 104.

The system is powered by standard low voltage rechargeable batteries, and the voltages are regulated, filtered and distributed to the appropriate sections. The detector bias voltage, analog electronics, and the digital electronics all have separate battery supplies to minimize noise pickup between these sections.

The system can be packaged in a portable briefcase which is 17"×13"×4". A briefcase this size is capable of containing the entire system including the detectors, the electronics, battery power supplies, and the output display. The array of detectors is preferably mounted on a frame with a coax cable carrying the signals to the electronics. The printed circuit boards are preferably mounted directly behind the detector array along with the batteries. The display is preferably mounted on top outside of the briefcase so that an operator can view the results.

A briefcase-sized neutron monitor with high sensitivity and source direction capability can help inspectors to detect and locate covert fissile material. A briefcase-sized system with external readouts can provide sensitivities up to 200 counts/s/nv with a directional, resolution of about +/−20 degrees. Additionally, the advanced sensor features low gamma sensitivity for improved neutron signal-to-noise measurement, real-time signal processing and display, and low voltage battery operation packaged in a lightweight, portable unit.

The present invention provides a portable survey instrument to detect and locate the source of thermal neutron radiation. The active detector element consists of an array of thin (<1 cm) stacks of 5.08 cm×5.08 cm silicon wafers adjacent to an extremely thin gadolinium (Gd) metal layer. The gadolinium absorbs thermal neutrons and emits low energy electrons through the internal conversion process. The low energy electrons are then fully absorbed in the silicon (Si) wafer that has sufficiently thick active region (or depletion depth) to detect the electron emission from the gadolinium layer, generating a signal which determines the thermal neutron count rate. This concept achieves high efficiency ($\geq 40\%$) for thermal neutron detection in a lightweight, compact array of sensor elements. A complete sensor system (including detector array, processing electronics, readout and power unit) can fit inside a standard briefcase. A key feature of this instrument is its ability to determine the direction of the incident thermal neutron flux. Directionality is achieved by a configured array of the detector elements and straightforward electronic processing of the signals from the array elements. The weight of the instrument is very low because no shielding material is required to establish the directionality of the sensor. The present invention is capable of nearly 360 degree detection with an angular resolution of approximately ±20 degrees.

A portable monitor preferably operates in a "window" counting mode, wherein all signals above the noise threshold, but below a maximum electron energy, are accepted as valid thermal-neutron signals. Background rates are established with otherwise identical detection elements that have metallic coating not sensitive to thermal neutrons. This background rate is subtracted from the valid thermal-neutron signals. Such a background-compensation technique removes in real-time both gamma ray and charged particle (e.g., muons, etc.) backgrounds from the thermal neutron signals.

While several embodiments and variations of the present invention for a directional thermal neutron detector are described in detail herein, it should be apparent that the disclosure and teachings of the present invention will suggest many alternative designs to those skilled in the art.

What is claimed is:

1. A directional thermal neutron detector for detecting thermal neutrons and determining the direction of the source of the thermal neutrons, comprising an array of individual thermal neutron detector modules, each individual detector module comprising front and back planar silicon detectors having a gadolinium foil sandwiched between the active areas of the front and back silicon detectors, the array of individual detector modules comprising a plurality of individual detector modules which are angularly displaced with respect to each other, and means for determining the direction of the thermal neutron source by comparing the magnitudes of the output signals of the angularly displaced different individual detector modules to determine the direction of the thermal neutron source.

2. A directional thermal neutron detector as specified in claim 1, wherein each thermal neutron detector module is segmented into a plurality of segmental areas to reduce the capacitance and the resultant noise of each detector module.

3. A directional thermal neutron detector as specified in claim 2, wherein each thermal neutron detector module is segmented into four quadrants to reduce the individual capacitance and the resultant noise of each detector module.

4. A directional thermal neutron detector as specified in claim 2, wherein each segmental area produces an output thermal neutron count signal, and including means for counting and storing separately the output thermal neutron count signal of each segmental area.

5. A directional thermal neutron detector as specified in claim 1, wherein each detector module produces an output thermal neutron count signal, and including means for forming ratios of the output count signals of the different detector modules to determine the direction of the thermal neutron source.

6. A directional thermal neutron detector as specified in claim 1, wherein the thickness of the gadolinium foil in each thermal neutron detector module is at least 15 microns, to improve the front-to-back silicon detector counting ratio to determine the side from which thermal neutrons are arriving at the detector.

7. A directional thermal neutron detector as specified in claim 6, wherein the gadolinium foil of at least 15 microns thickness makes each detector module substantially opaque to thermal neutrons, and the detector modules are positioned relative to each other in the array to shield one another from thermal neutrons, thereby enhancing the angular resolution of the directional thermal neutron detector.

8. A directional thermal neutron detector as specified in claim 1, including means for discriminating against gamma rays by performing coincidence signal processing between the output signals of the front and back silicon detectors of each detector module, wherein simultaneous signal counts of the front and back detectors are disregarded, to minimize the contribution of gamma rays to the signal produced by the detector module, thereby enhancing the detectional selectivity to thermal neutrons.

9. A directional thermal neutron detector as specified in claim 1, further including a gamma ray detector compensator module comprising front and back planar silicon detectors having a tantalum foil sandwiched between the active areas of the front and back silicon detectors, with the tantalum foil having a low thermal neutron cross-section sized to compensate for gamma ray responses by the thermal neutron detector modules, wherein the count signal measured by the gamma ray compensator is subtracted from count signals from the thermal neutron detector modules to determine the net thermal neutron count.

10. A directional thermal neutron detector as specified in claim 1, wherein the array of thermal neutron detector modules includes at least one detector module oriented in a first direction, and at least one detector module oriented in a second direction inclined at a positive angle relative to the first direction.

11. A directional thermal neutron detector as specified in claim 10, wherein said positive angle is substantially +90°.

12. A directional thermal neutron detector as specified in claim 11, wherein the output signals from modules oriented in the same direction are summed in a separate counter, thus providing a separate summed output for each direction, and the direction of the thermal neutron source is determined by comparing the counts in each of the separate counters.

13. A directional thermal neutron detector as specified in claim 10, further including at least one detector module oriented in a third direction inclined at a negative angle relative to the first direction.

14. A directional thermal neutron detector as specified in claim 13, wherein said positive angle is substantially +45°, and said negative angle is substantially −45°.

15. A directional thermal neutron detector as specified in claim 13, wherein the array of thermal neutron detector modules includes a plurality of detector modules oriented in the first direction, a plurality of detector modules oriented in the second direction, and a plurality of detector modules oriented in the third direction to increase the area efficiency product (A$\epsilon$) of the directional thermal neutron detector.

16. A directional thermal neutron detector as specified in claim 10, including means for determining in real-time the direction of the thermal neutron source based upon the count ratios between the different detector modules.

17. A directional thermal neutron detector as specified in claim 10, wherein the array of thermal neutron detector modules includes a plurality of detector modules oriented in the first direction, and a plurality of detector modules oriented in the second direction, to increase the area efficiency product (A$\epsilon$) of the directional thermal neutron detector.

18. A directional thermal neutron detector as specified in claim 17, wherein the array of thermal neutron detector modules includes at least six detector modules arranged in an H-configured array to provide 360 degree sensitivity and detection coverage, while also providing shielding of adjacent detector modules to improve the angular resolution of the detector array.

19. A directional thermal neutron detector for detecting thermal neutrons and determining the direction of the source of the thermal neutrons, comprising front and back planar silicon detectors having a gadolinium foil sandwiched between the active areas of the front and back silicon detectors, wherein the thickness of the gadolinium foil is at least 15 microns, to improve the front-to-back- silicon detector counting ratio to determine the side from which thermal neutrons are arriving at the detector.

20. A directional thermal neutron detector as specified in claim 19, wherein the gadolinium foil of at least 15 microns thickness makes the detector substantially opaque to thermal neutrons, and the detector is positioned relative to other detectors in an array of detectors to shield one another from thermal neutrons.

21. A thermal neutron detector for detecting thermal neutrons comprising front and back planar silicon detectors having a gadolinium foil sandwiched between the active areas of the front and back silicon detectors, including means for discriminating against gamma rays by performing coincidence signal processing between the output signals of the front and back silicon detectors of, wherein simultaneous signal counts of the front and back detectors are disregarded, to minimize the contribution of gamma rays to the signal produced by the thermal neutron detector, thereby enhancing the detectional selectivity to thermal neutrons.

* * * * *